United States Patent [19]
Collier et al.

[11] Patent Number: 5,815,152
[45] Date of Patent: Sep. 29, 1998

[54] METHOD AND APPARATUS FOR DEFINING AND EVALUATING A GRAPHIC RULE

[75] Inventors: Mary F. Collier; Michael K. Bennett, both of Columbia, Md.

[73] Assignee: Logical Software Solutions Corporation, Greenbelt, Md.

[21] Appl. No.: 879,087

[22] Filed: Jun. 19, 1997

Related U.S. Application Data

[63] Continuation of Ser. No. 423,759, Apr. 18, 1995, abandoned.

[51] Int. Cl.$^6$ .................................................. G06F 15/20
[52] U.S. Cl. ......................................... 395/348; 395/340
[58] Field of Search .................................. 395/348, 340, 395/326, 341, 342, 343, 339

[56] References Cited

U.S. PATENT DOCUMENTS

| | | | |
|---|---|---|---|
| 5,019,961 | 5/1991 | Addesso et al. ........................ | 364/192 |
| 5,325,533 | 6/1994 | McInerney et al. ..................... | 395/700 |
| 5,450,545 | 9/1995 | Martin et al. ........................... | 395/700 |
| 5,500,934 | 3/1996 | Austin et al. ........................... | 395/349 |
| 5,504,853 | 4/1996 | Schuur et al. .......................... | 395/349 |
| 5,519,866 | 5/1996 | Lawrence et al. ...................... | 395/700 |

*Primary Examiner*—Raymond J. Bayerl
*Assistant Examiner*—Steven P. Sax
*Attorney, Agent, or Firm*—Banner & Witcoff, Ltd.

[57] ABSTRACT

A method and apparatus is provided for graphically defining a rule to be evaluated by a computer system for determining actions to be taken when processing a particular instance of a system entity. Each rule contains one or more conditions, each of which evaluates to at least two alternatives. One or more actions may be defined for each alternative which will be executed upon evaluation of the condition.

12 Claims, 18 Drawing Sheets

METHOD AND APPARATUS FOR DEFINING AND EVALUATING A GRAPHIC RULE

This application is a CONTINUATION of application Ser. No. 08/423,759, filed Apr. 18, 1995, now abandoned.

FIELD OF INVENTION

The invention generally relates to a method and apparatus for defining a rule to be evaluated by a system and, more particularly, to using a graphical construct for rule development and display.

BACKGROUND OF INVENTION

Existing methods which provide for the definition and display of rules are carried out using table and text entry methods. A rule is a set of criteria that is enforced on a case. A case is an individual instance of work to be performed for a business process—a collection of information organized by folder, documents, and forms. An example of a case is an insurance claim which involves information organized in folders, documents and forms. An instance of a case moves through a workflow process. A workflow process is a business function described by all its attributes, flow, rules, user assignments, information requirements, and forms. A rule evaluates case data values to determine the appropriate action or path a case is to take during a workflow process.

An example table and text entry method provides means for entering rule conditions and actions to be taken by selecting fields from list boxes and entering case values in a dialog box. This type of system takes the user through a series of windows to collect the information needed to define the condition(s).

Several drawbacks are associated with the existing methods for defining and displaying rules. For example, the table and text entry method does not provide an overall view of either the conditions to be evaluated or their respective placement in the overall process. Using this method, the rule is associated with a task in a process. However, the method fails to provide for the graphical creation or display of the rule. While the process and the routes that are to be taken may be displayed graphically, there is no connection to the rule and its evaluation. For example, any map (i.e., a diagram of the path a case can take through a process) of the rule definition would not be drawn by the system based on the rule definition. Rather, such a map would merely be drawn by a user. Accordingly, the possibility of the process being misrepresented exists. If drawn inaccurately, a map would fail to show the correct paths or alternatives defined by the table and text rule definition window.

SUMMARY OF THE INVENTION

The present invention overcomes the aforementioned disadvantages by providing a structured graphical representation of an automated rule. The graphical rule definition and evaluation method enables a user to graphically construct and view a system rule.

Several advantages are realized by the present invention. For example, the present invention provides improved productivity and reduced costs over prior art systems by employing an easy to set up process definition and evaluation method.

The present invention provides a means for a creator of a rule to both construct and view the rule paths and actions through a graphical format. The system automatically constructs the rule based on the graphical definition, thus assuring that the rule and map will always be in agreement. More specifically, as the user defines the rule, the map of the rule is generated by the system in accordance with the graphical rule definition. Therefore, the present invention eliminates any possible inconsistency between the rule and the map.

The present invention further provides a means to graphically show multiple conditions and allow evaluation of additional conditions based on the evaluation results of a previous condition, all within one rule. Also, the present invention provides a structure for defining rule conditions and automatically creating graphical representations of the associated condition.

By graphically displaying the rule conditions, the creator can easily examine the graphical representation to determine whether the rule is being appropriately defined, for example whether the proper paths are being created. This is particularly advantageous when a rule contains multiple conditions.

If an error has been made in defining the rule, the creator of the rule can easily modify the rule and thereby modify the map so that a new or modified map does not have to be generated manually.

No programming or script is required. Rather, drag and drop functions are performed by the user using graphic representations of each object to define a process. Consequently, graphical construction of the rule makes it simple for any person to define the rule. Further, the process including the rule is easier to understand when displayed graphically.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to exemplary workflow systems. It is to be understood that the present invention may be applied to many systems including, but not limited to, a project management system, tracking system, spreadsheet, word processor, network management tool, operating system and database monitor. In a spreadsheet, a rule definition could be used to invoke a macro or another action.

The present invention provides a method for graphically defining and displaying a rule to be evaluated by a workflow system for determining actions to be taken by the system when processing a particular occurrence of a system entity. Each rule contains one or more conditions which evaluate to one of several values, typically TRUE or FALSE. One or multiple actions may be defined for each TRUE and each FALSE result.

For example, in a window environment, such as MICROSOFT® WINDOWS™ version 3.1 or higher, a rule can appear on the computer screen as a graphic icon. When selected, the rule is graphically displayed on the computer screen as one or often a series of conditions. Each condition is displayed as a graphic icon. Each condition icon is typically followed by a two-prong branch displaying TRUE and FALSE legs. One or many objects are added and displayed on each TRUE and FALSE leg. The objects can be action objects and/or routing objects. An action object is an icon representing a specific action to be executed by the system when the condition expression is evaluated. Each action object is represented as a graphic icon on the TRUE and FALSE legs.

Figure 1:
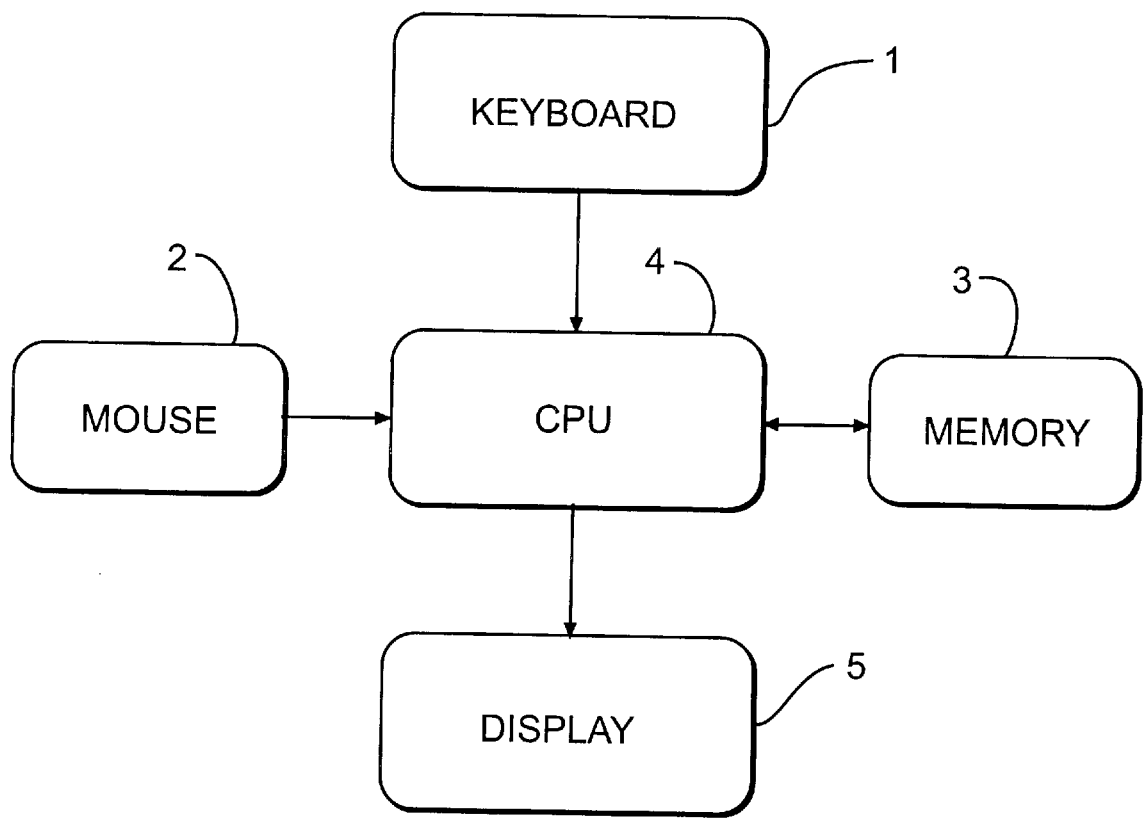
FIG. 1 shows an exemplary interactive computer system used for defining a rule according to embodiments of the present invention and environments thereof.

Embodiments contemplated by the present invention and environments thereof can best be described with regard to FIG. 1. Referring now to FIG. 1, this figure represents a computer environment such as those from either single or multiple-user computers having one or more processors. In addition, the computer environment can pertain to microcomputers/workstations, minicomputers, mainframes and massively parallel processing computers. Examples of microcomputers/workstations include the IBM PC manufactured from IBM Corporation of Armonk, N.Y., and the Sparc-Station from Sun Microsystems of Mountain View, Calif. Examples of minicomputers are the VAX 750 from Digital Equipment Corporation of Maynard, Mass. and the AS/400 from IBM; and an example of a massively parallel processing computer is the Cray T3D from Cray Research of Eagan, Minn. Of course, any number of other types of computer systems are also contemplated for use with the present invention. Also, the present invention contemplates that two or more of such computer environments can be linked and used together.

An interactive computer system depicted in FIG. 1 includes a keyboard 1, a trackball (e.g., mouse) 2, static and dynamic memory 3, a central processing unit 4, and one or more display screens 5.

The static and dynamic memory can include RAM and ROM. RAM can be any type of memory device, including DRAMS and SRAMS. ROM can be used to store any number of different types of information required by the CPU 4. For example, information concerning initialization routines or even some or all of a processor environment and a display environment that will not be changed over the course of defining a process. Embodiments of the present invention contemplate that ROM can be any number of different types of device including, but not limited to, PROMs, EPROMs, and EEPROMs.

Further, the memory 3 may include a storage device. Storage devices contemplated by the present invention include, among others, magnetic, electrical, optical, and biological types of storage. Various embodiments of the present invention contemplate that all or some of the processor environment and the display environment can be encompassed by a storage device.

In addition, any number of operating systems can be used with regard to the computer environment used with the present invention, including any of the various versions of Unix, VMS from Digital Equipment or OS/2 from IBM.

Other input means such as a voice recognizition device, touch pad, light pen and any other type of device by which information can be entered into the interactive computer system may also be employed for the keyboard 1 or mouse 2 or in addition thereto.

The display 5 can be any number of displays having various resolutions, including those of the CRT and flat-panel display types.

The interactive computer system is used in defining a rule. The following description describes embodiments of the present invention that assumes that a computer system for defining a rule has both a keyboard and mouse.

Figure 2:
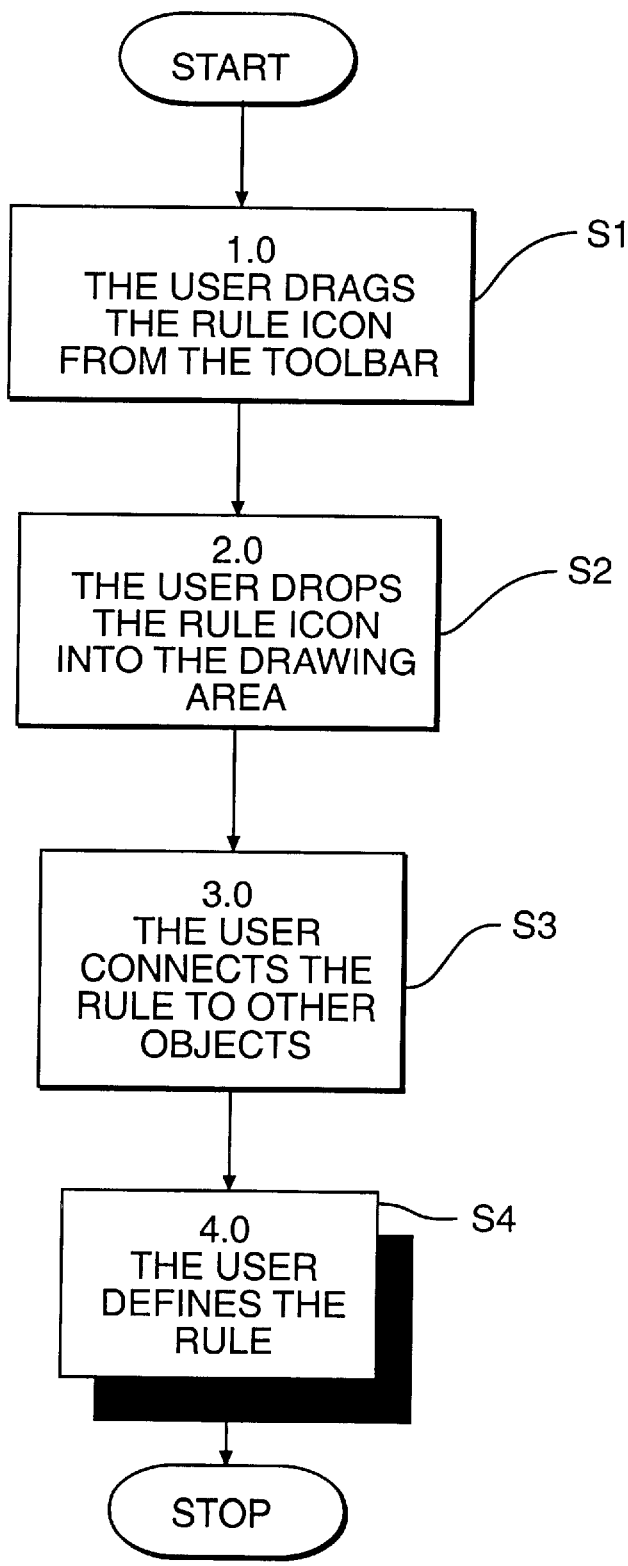
FIG. 2 is a flow diagram showing the steps involved in creating a rule according to embodiments of the present invention.
Figure 3:
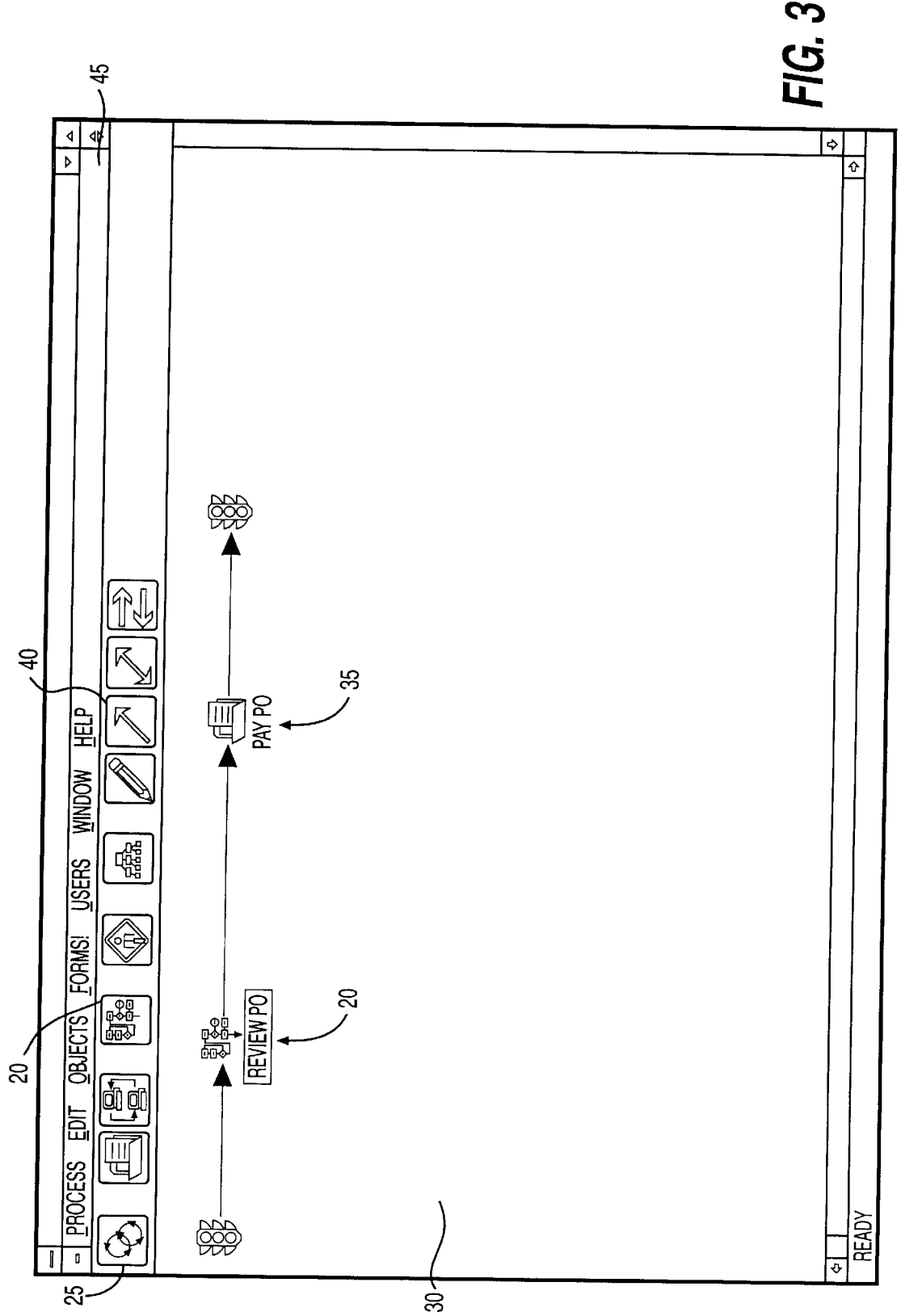
FIG. 3 is a display screen showing an illustrative workflow process according to embodiments of the present invention.

FIG. 2 is a flow diagram showing steps involved in creating a rule. FIG. 3 is a display screen showing an exemplary workflow process in which a rule is defined to evaluate a purchase order and determine what processing actions are required based on the purchase order information. Each rule includes one or more conditions defined in a rule window.

Referring to FIGS. 2 and 3, to create a rule for a process, a user selects a rule icon 20. A user employs a mouse to position a cursor on the rule icon 20 and then drags the rule icon (or button) 20 from a toolbar 25 (step S1). The user drops the rule icon 20 into the drawing area 30 and positions it as desired (step S2). Next, the user connects the rule to other objects (e.g., the task Pay PO 35) in the drawing area 30 (step S3). To connect two objects together, a line tool 40 from the toolbar is selected, dragged, and placed between the two objects. Finally, the user defines the rule (step S4) as described below.

To create multiple rules, a rule icon 20 is selected from the toolbar 25 by positioning the mouse cursor on the rule icon 20 and clicking. The mouse cursor turns into the rule icon 20 and is then positioned in the drawing area 30. For each rule to be added, the user clicks the mouse once. The user can exit this routine by clicking the cursor on the rule icon 20 or pressing the ESC button on the keyboard.

Prior to actually configuring a rule, a rule icon 20 in the drawing area 30 is selected by positioning the mouse cursor on the rule icon 20 and clicking with the left mouse button. Next, the rule icon 20 to be configured is selected by either 1) selecting the Objects menu from the menu groups 45 found on the top of the display screen and selecting the rule command; or 2) positioning the mouse cursor on the rule icon 20 and clicking with the right mouse button. Then a rule field and a description field appear on the display screen where the user can respectively enter a name and description for the rule.

Figure 4:
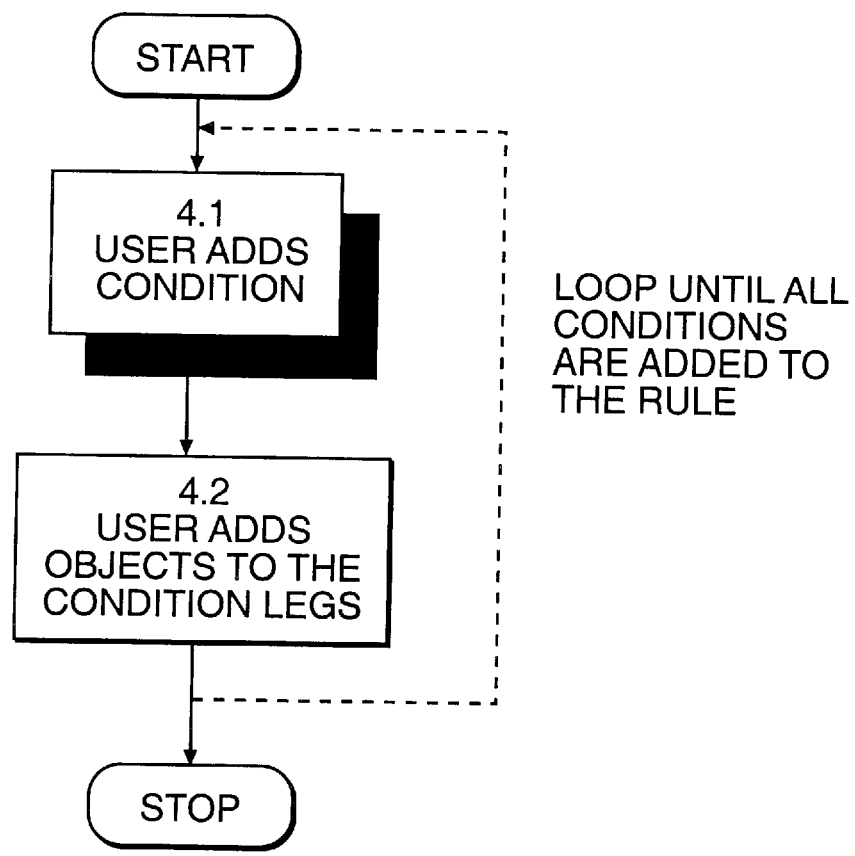
FIG. 4 is a flow diagram showing the steps involved in the step of configuring a rule shown in FIG. 2 according to embodiments of the present invention.
Figure 5:
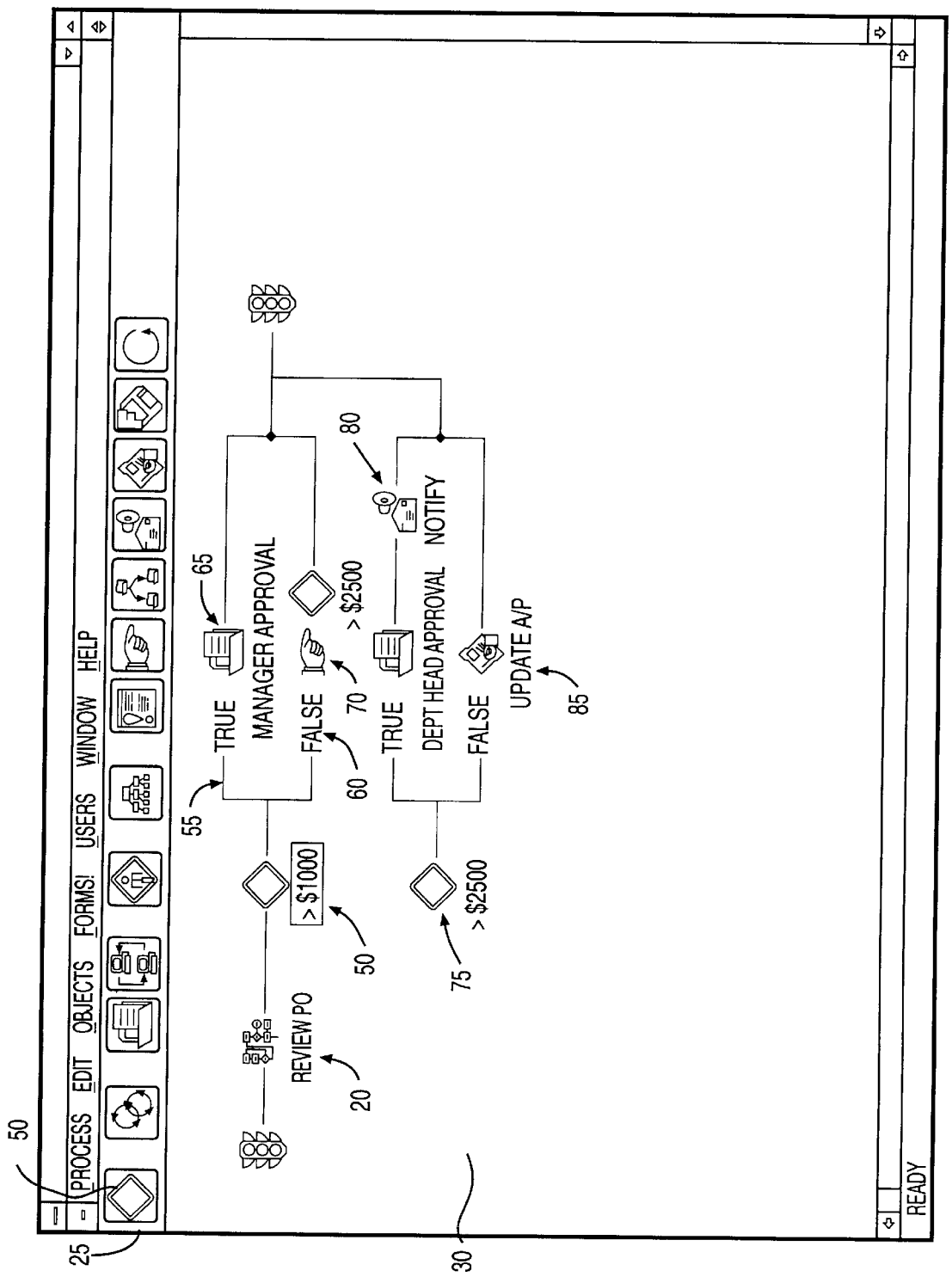
FIG. 5 is a display screen showing an example of a configured rule.

The flow diagram for defining a rule is shown in FIG. 4. FIG. 5 shows an example of a defined rule. To define a rule the user adds a condition to the rule (step S4.1). A condition is a simple or complex logical expression which, upon evaluation, will execute the predefined action object(s) and/or the case will be sent an to additional routing object. Conditions are defined within a rule based on values of case data fields.

Figure 6:
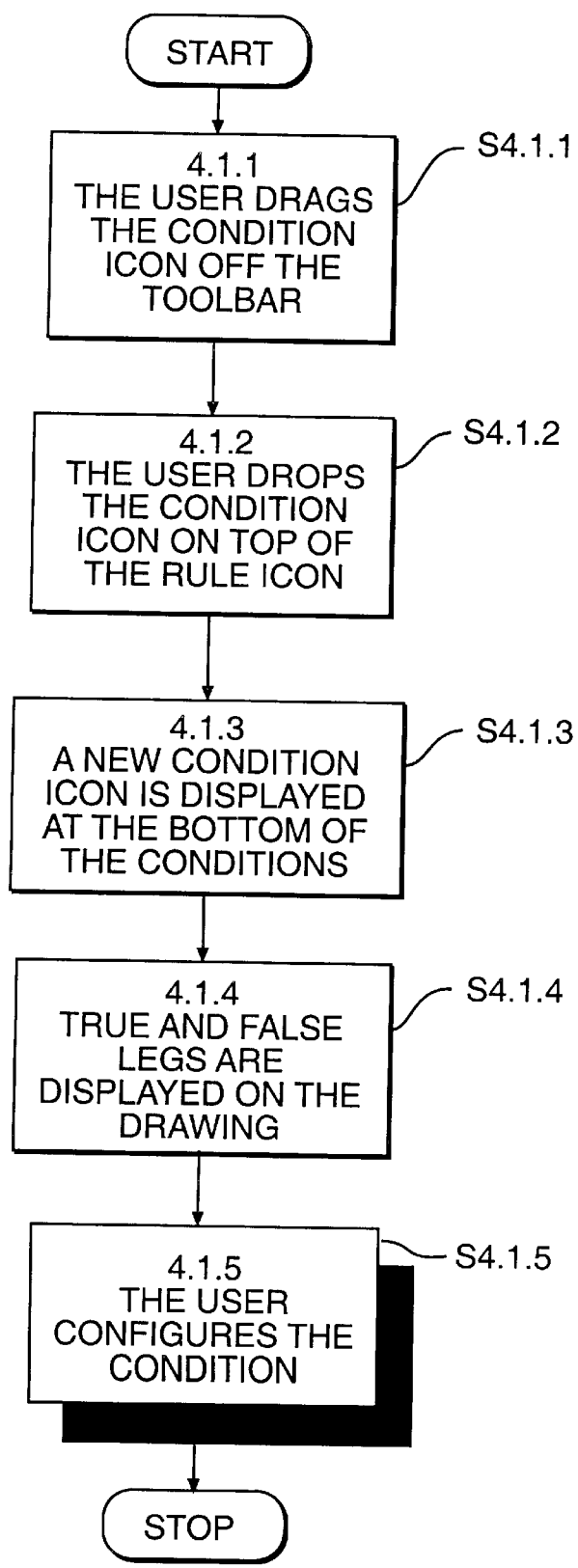
FIG. 6 is a flow diagram showing the steps involved in the step of adding a condition to a rule in FIG. 4 according to embodiments of the present invention.

To add a condition to a rule (step S4.1), the steps shown in the flow diagram of FIG. 6 are followed. The user drags the condition icon 50 off the toolbar 25 (S4.1.1) and drops it on top of the rule icon 20 in the display window 30 (S4.1.2). The work flow system displays the new condition icon 50 to the right of the rule icon 20 in the display window 30, underneath any previously defined condition icons (4.1.3) as shown in FIG. 5. To create multiple conditions, the user clicks on the condition icon 50 in the toolbar 25 and the mouse cursor turns into the condition icon 50. For each condition to be added, the user clicks once on top of the rule icon 20 in the drawing area 30. This step is repeated for each condition to be added. The user can exit the condition adding routine by clicking the cursor on the condition icon 50 or pressing the ESC button on the keyboard.

Next, according to this example, the workflow system displays a TRUE leg 55 and a FALSE leg 60 to the right of the condition icon (step S4.1.4). Thereafter, the user configures the logical expression for a condition (step S4.1.5). The logical expression is a series of one or more logical terms that are joined by a connecting operator such as AND or OR. The steps involved in configuring the condition are depicted in the flow chart of FIG. 7.

Figure 8:
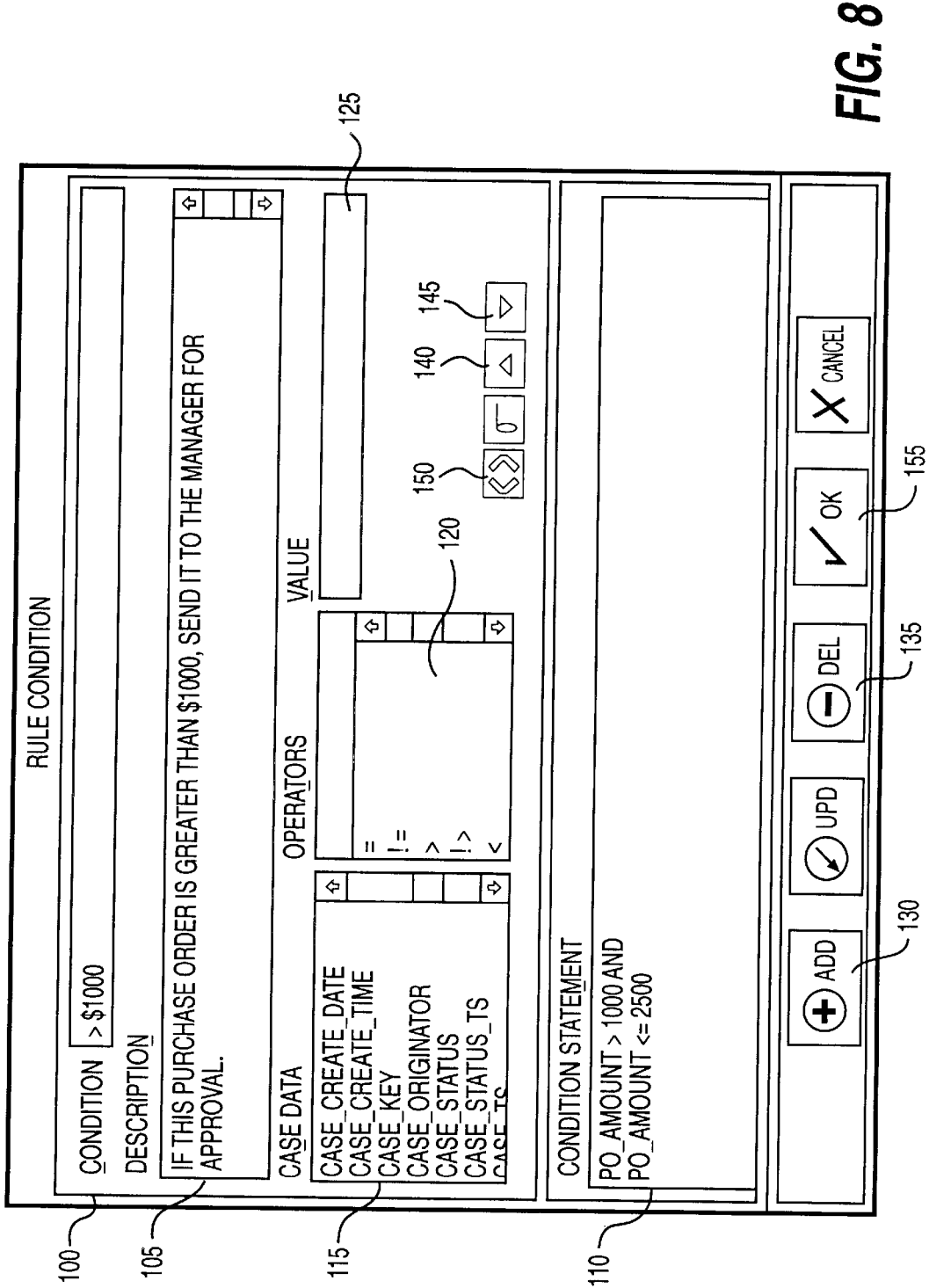
FIG. 8 shows an illustrative rule condition dialog according to embodiments of the present invention.

To configure the condition, first the user selects the condition icon 50 located in the display area 30 to be configured (step S4.1.5.1) in a manner similar to how a rule is selected as described above. Next, a rule condition dialog, as depicted in FIG. 8, is displayed (step S4.1.5.2). The user enters the name of the condition in the condition field 100 via the keyboard, e.g., ">$1000", (step S4.1.5.3), and then enters a description of the function of the condition in the description field 105 (step S4.1.5.4). After completing the above steps, the user is now ready to add one or more condition items to the condition statement 110 at the bottom of the rule condition dialog (step S4.1.5.5). The steps involved in adding a condition statement are shown in the FIG. 9 flow diagram.

To add a condition statement, the user selects a field from a case data listbox 115 to use as criteria for a condition item, e.g., "PO_AMOUNT"(step S4.1.5.5.1). The listbox 115 displays all of the data fields that can be evaluated. The case data comes from fields that have been previously defined. One of the operators to be used for the case data field is selected from the operator listbox 120 (step S4.1.5.5.2). Operators are used to define the relationship between the case data and the search value or range of values. For example, to perform an action on all cases with a purchase order amount >$1000, the appropriate statement is:

PO_AMOUNT>1000

According to another illustration, the statement:

DATE>=Sep. 15, 1994 AND DATE<=Dec. 31, 1994 would return all cases with date values greater than or equal to Sep. 15, 1994 and less than or equal to Dec. 31, 1994.

The user then enters the value to be used in the expression, i.e., the value to be found for the selected case data field, in the value field 125 such as "1000" (step S4.1.5.5.3). Values are checked against the data type of the case data field. Typical data types include, among others, string, data, and numeric. To add the statement to the condition which is represented by the case data field, the operator, and the value selected, the user clicks the mouse on the ADD button 130 (step S4.1.5.5.4) and the new condition item is displayed in the condition statement listbox 110, e.g., "PO_AMOUNT>1000" (step S4.1.5.5.5).

To add criteria to the conditional statement including additional case data fields, the steps involved in adding a condition statement are repeated until all expressions are added to the condition statement in the condition statement listbox 110. To change a condition item, the user selects one condition item(s) in the condition statement listbox 110. Next, the user changes the operator, and enters the appropriate new value. To delete a condition item(s), the user makes a continuous selection of one or more condition items and the delete button 135 is pressed using the mouse.

To change the AND or the OR which connect two condition items, the condition item ending with the AND or the OR operator is selected and the new connector (AND or OR) is selected. To reverse or change the order of condition items, one or more conditions in the condition statement listbox 110 are continuously selected. The user presses the up arrow button 140 to move the selection up one position and the down arrow button 145 to move the selection down one position. Different levels of nested parentheses around and within the group condition items are automatically adjusted as the selection is moved up or down.

To parenthesize a group of condition items together, a continuous selection of condition items in the condition statement listbox is made. Then the parentheses button 150 is pressed to either add or delete a pair of parentheses around the selection. The open parenthesis is added at (or deleted from) the start of the first condition item in the selection. The close parenthesis is added at (or deleted from) the end of the last condition item in the selection.

To reorder conditions within a rule, the condition icon to be reordered is selected. Then the condition icon is dragged to above, below, or in between other condition icons and dropped when at the desired location.

Once the user has completed configuring the condition in the manner described above, the OK button 155 is pressed (step S4.1.5.6).

Figure 7:
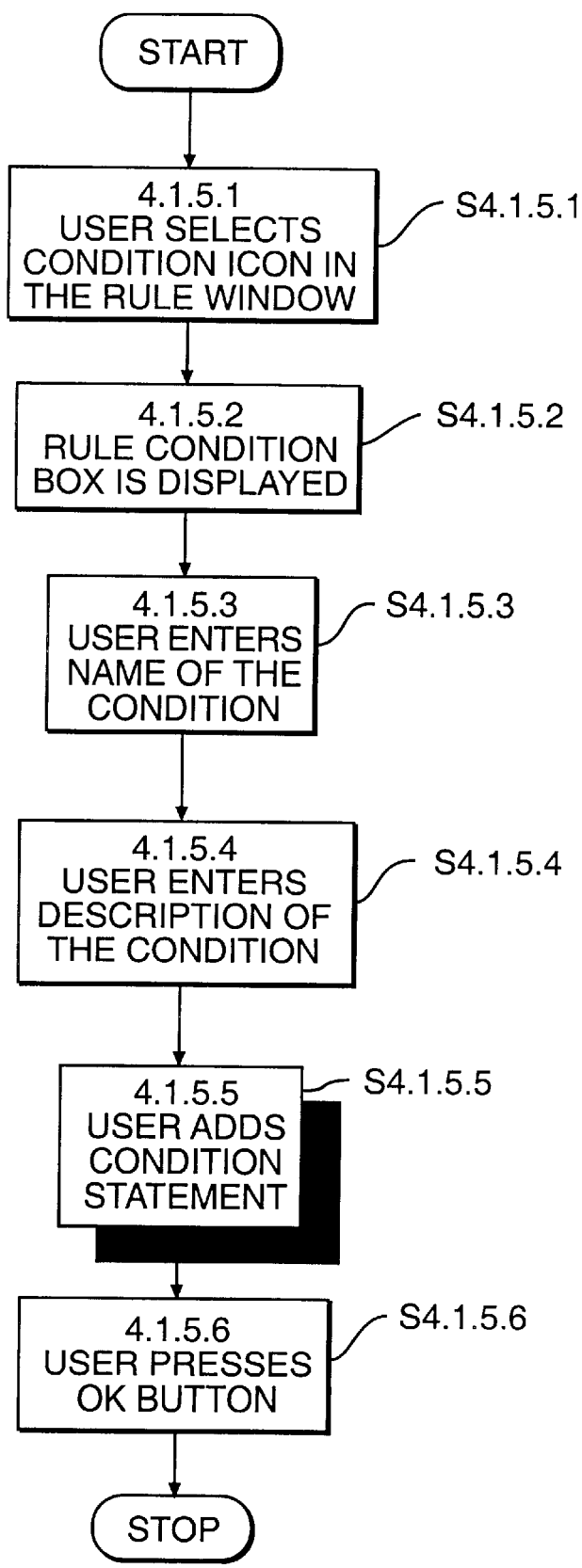
FIG. 7 is a flow diagram showing the steps involved in the step of configuring a condition in FIG. 6.
Figure 9:
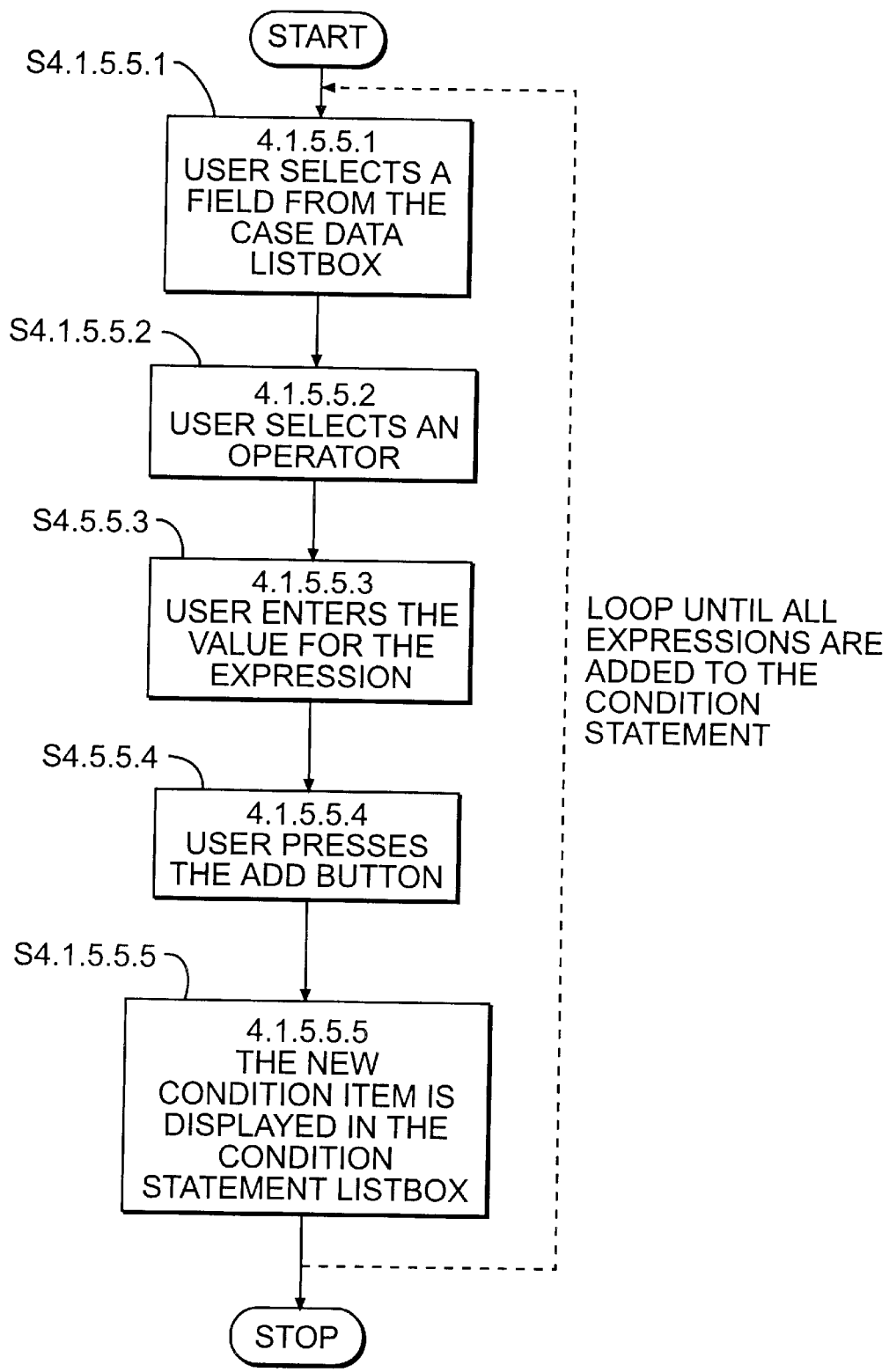
FIG. 9 is a flow diagram showing the steps involved in the step of adding a condition statement in FIG. 7 according to embodiments of the present invention.

After adding the condition to the rule as shown in FIG. 6, including configuring the condition as shown in FIG. 7 which includes adding the condition statement as shown in FIG. 9, the user adds objects 65 and 70 to the TRUE and FALSE legs 55 and 60, respectively as depicted in FIG. 5 and as recited in step 4.2 of FIG. 4.

Typically, each condition yields a true or false result. However, it is to be understood that a condition may yield more than two results. These two values appear as legs 55, 60 emanating from the condition 50. Each TRUE and FALSE leg of a condition can have a series of action objects and/or routing objects.

Example of action objects which can be added to a condition leg include: 1) a message action object which displays a message to the user; 2) a go to action object which transfers control to another condition within the current rule; 3) a spawn action object which creates a copy of a case and routes the copy to any subprocess defined in the current process; 4) a notify action object which uses available electronic mail or custom facilities to send a message to one or more users; 5) custom action object which executes any external application such as updating a mainframe database or sending a facsimile; 6) update case data action object which automatically sets case data fields to a specified value, e.g., unconditionally updates case data fields with constant/ expression values; and 7) loop action object which transfers control back to the rule where evaluation begins at the first condition of the current rule.

Exemplary routing objects include a subprocess, manual task, automated task, manual decision point, and parallel, each of which will be described in more detail later. A condition leg may have either a routing object and/or a series of action objects. If the action object is a go to action object, then no routing object may be placed on that leg.

Figure 10:
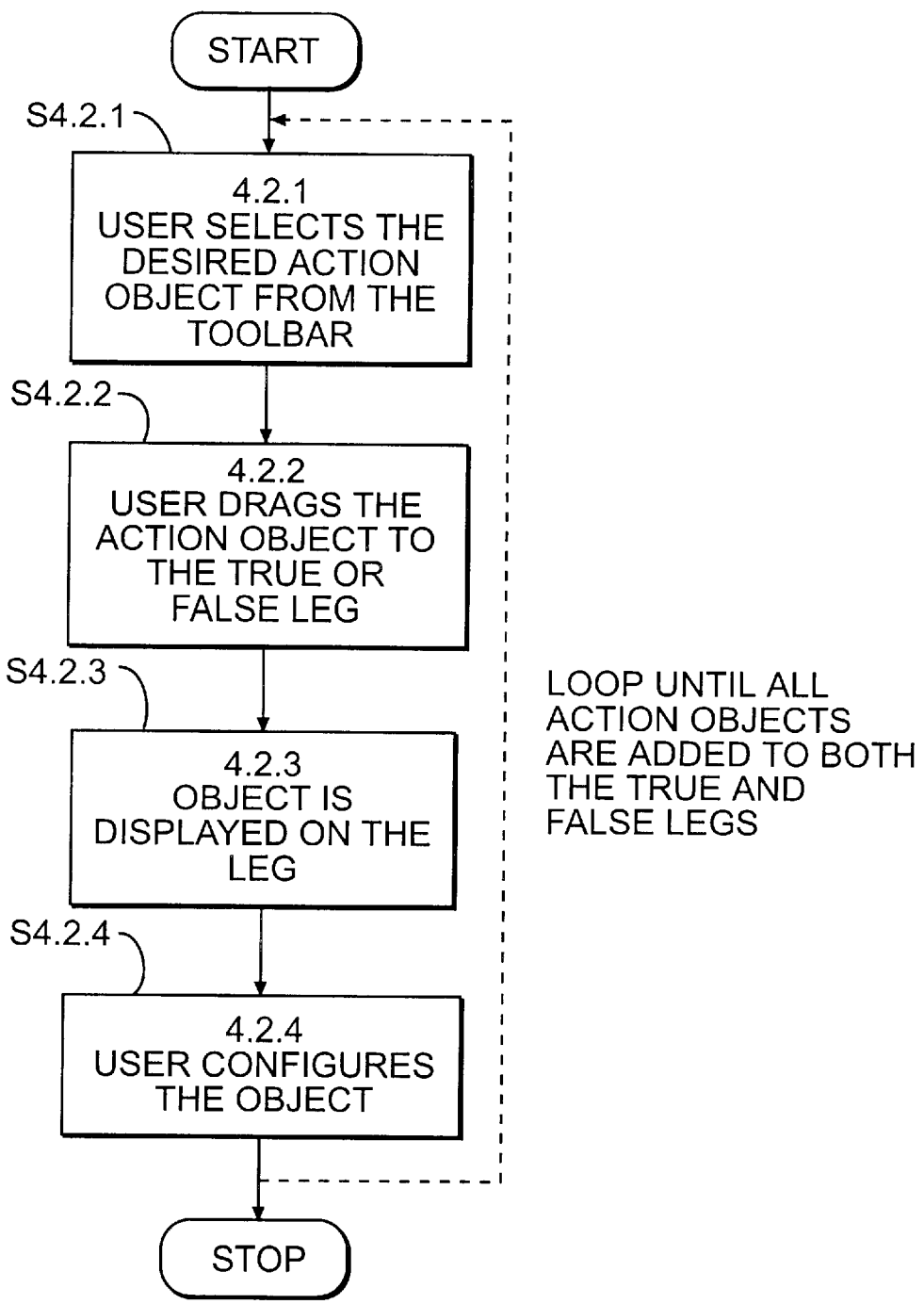
FIG. 10 is a flow diagram showing the steps involved in the step of adding objects to condition legs in FIG. 4.

FIG. 10 is a flow diagram of the steps involved in adding objects to condition legs. To add an action object and/or a routing object to a condition leg, a user selects the desired object from the toolbar 25 (step S4.2.1). An action object is an icon representing a specific action to be executed by the system when the condition expression is evaluated. The user drags the action object off the toolbar 25 to the condition leg, e.g., the TRUE leg 55 or the FALSE leg 60, and drops the action object on top of the condition leg, for example the word "TRUE" (step S4.2.2). The action object (e.g., 65 and 70 in FIG. 5) is added and displayed at the end of the condition leg (step S4.2.3). Once the action object has been created, it is configured with appropriate and relevant parameters (step S4.2.4).

The configuration process depends upon the information needed by the action object for system execution. In the example depicted in FIG. 5, the rule for reviewing a purchase order has already been configured including adding objects 65, 70 to the legs of the first condition 50 and repeating the same process to construct the second condition 75.

Based upon the above discussion, the example of FIG. 5 is now specifically explained. Referring again to FIG. 5, for a first defined condition 50, if a purchase order amount is >$1000 and <=$2500, the first condition 50 evaluates to TRUE and the case is sent to a manager for approval. If the purchase order amount is not >$1000 and <=$2500, the first condition 50 evaluates to FALSE and the second condition 75 is evaluated via the go to action object 70 (the goto points at the condition icon for the second condition which is duplicated below the first condition 50 and identified as 75). In the second condition 75, if the purchase order is >$2500 and the condition evaluates to TRUE, the purchase order is sent to the department head for approval and a notification via notify action object 80 is sent to the purchasing agent. Otherwise, if the purchase order is not >$2500 and evaluates to FALSE, the accounts payable system is updated via the update case data action object 85. In each scenario, the case continues on the main route to the next task of paying the purchase order 35 in the exemplary process depicted in FIG. 3.

To change and set specific characteristics of an object selected by the mouse, the object menu for a rule window is accessed by selecting "Objects" from the menu 45 shown in FIG. 3. The selected object can be a condition, an action, or an additional routing object.

Routing objects on a condition leg can be a subprocess, manual task, automated task, a MDP (manual decision point), or a parallel object. A subprocess is a collection of tasks to which control will be transferred. A manual task is a task that must be performed by a human, e.g., draft special letter for responding to a job applicant. An automated task provides a machine to machine interface allowing custom processing of cases. Examples of types of processing which can be performed by automated tasks are complex work distribution, OCR processing, access to mainframe sessions, pre-staging document management system file, and form letter generation. Any task that can be done automatically at some point within the workflow system is an automated task candidate. A manual decision point is a time when a human makes a decision and based on that decision the process flow is routed accordingly, e.g., should this job applicant be hired. A parallel routing object is a collection of tasks which can be performed concurrently. All tasks defined as part of the parallel routing object must be completed prior to the system routing the case to the next task defined in the process.

After the action object has been added, it is then configured (step S4.2.4). Below are descriptions of how various action objects are configured.

Figure 11:
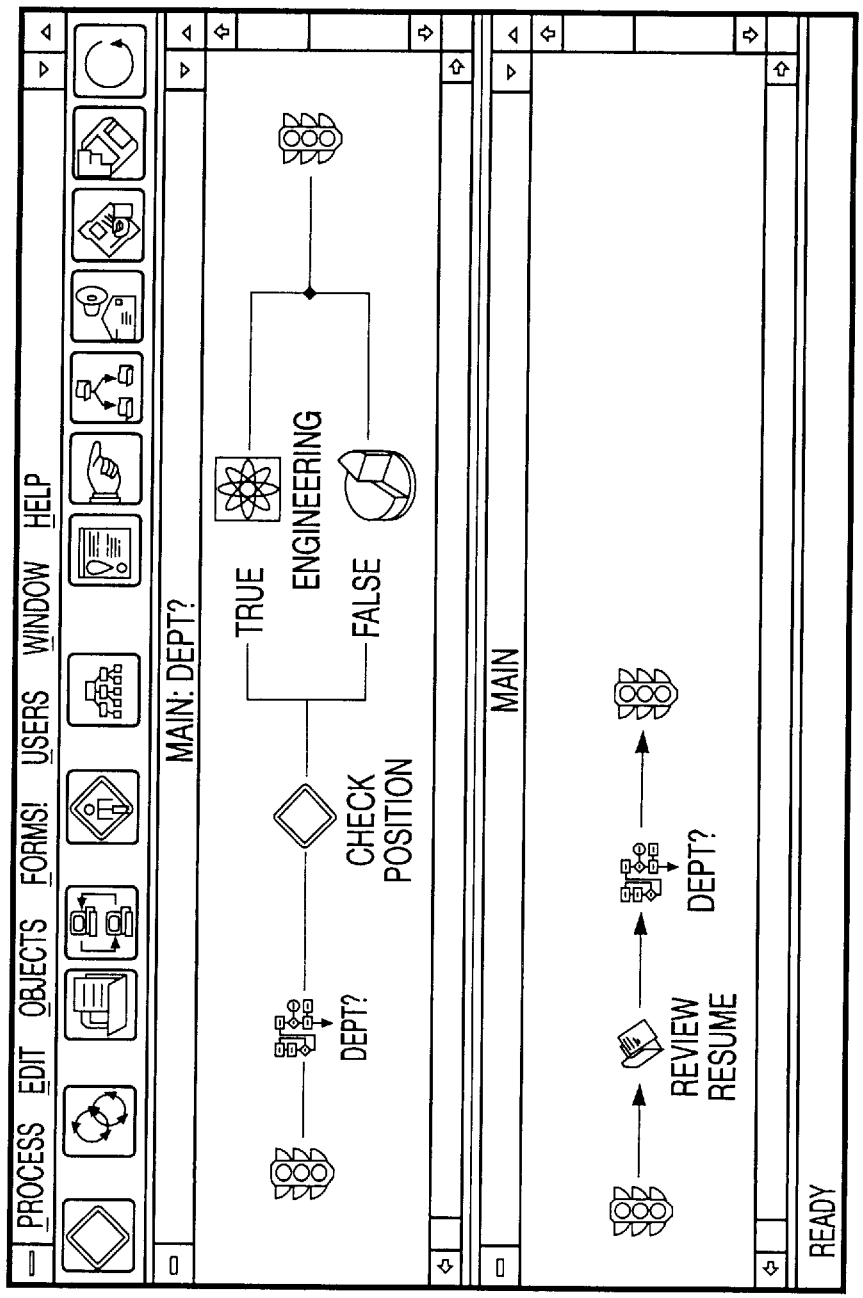
FIG. 11 depicts a rule window area according to embodiments of the present invention.
Figure 12:
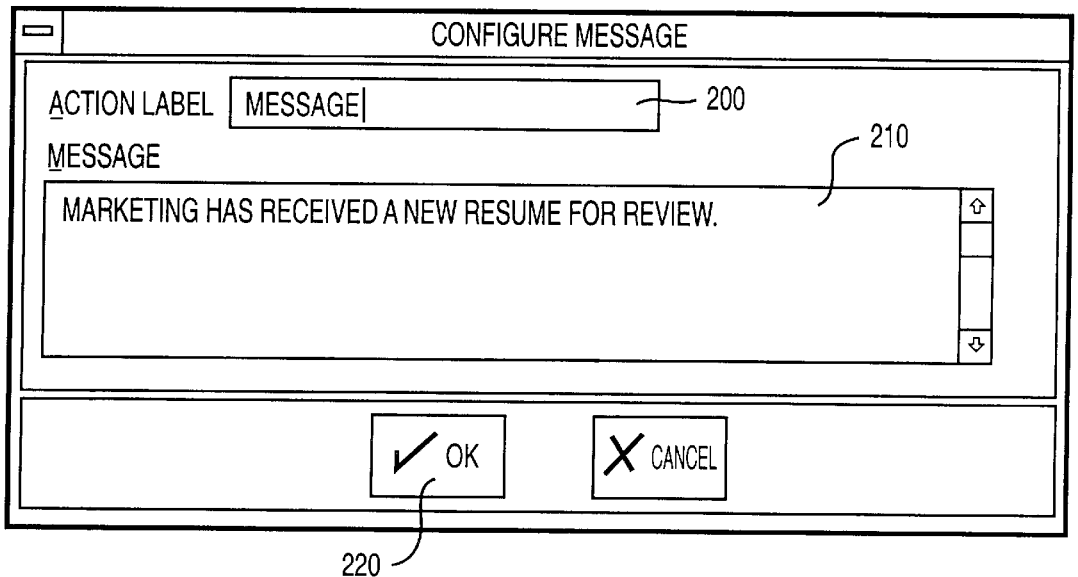
FIG. 12 shows a configure message dialog in which a message action object is configured according to embodiments of the present invention.

The message action object displays a diagnostic message on the screen using a dialog box. To configure a message action object, the message action icon is selected in a rule window area such as depicted in FIG. 11 by either selecting the action objects menu beneath the objects menu and selecting the enabled menu command of the selected object icon or clicking on the icon of the action object with the right mouse button. The configure message dialog shown in FIG. 12 is displayed. The user then enters via a keyboard a unique name for the message action object in the action label field 200 having a length of between one and twenty characters. Next, the user enters, via the keyboard, message text of typically no more than 254 characters in a message text box 210. The message is the text that will be displayed to the user. When finished entering and/or correcting the information, the user selects the OK button 220.

A go to action object allows a condition to branch or jump to another condition in the current rule for criteria matching. Jumps can occur in a forward (or graphically, a downward) manner. To configure a go to action object, the user selects the go to action icon and accesses it similarly to the action object previously described. When a go to action object is added, a condition icon appears to its immediate right (see FIG. 4). When the user clicks the go to icon, the caption beneath the condition icon is selected.

Figure 13:
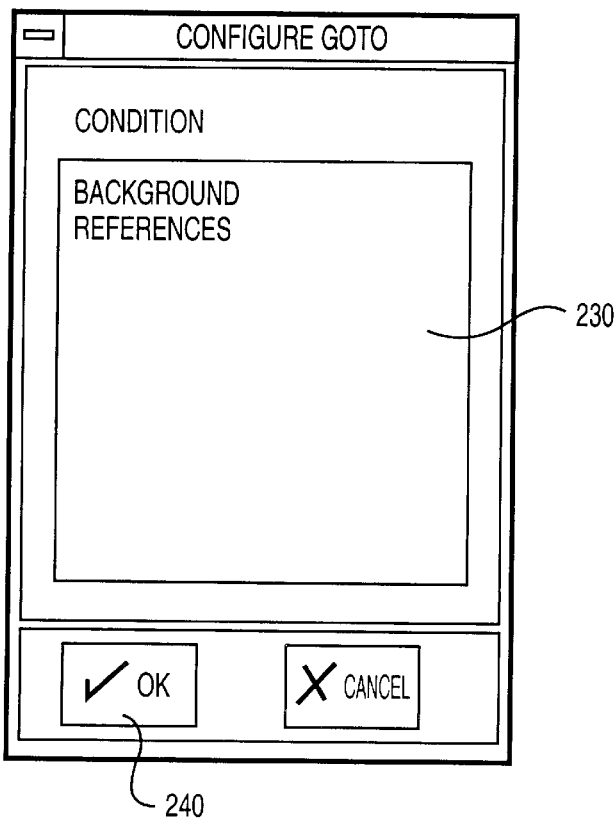
FIG. 13 shows a configure go to dialog in which a go to action object is configured according to embodiments of the present invention.

After the go to icon is selected, a configure go to dialog box appears, for example as shown in FIG. 13. The user selects one condition to jump to from a list of conditions displayed in the condition listbox 230. The condition listbox 230 displays a list of the remaining conditions in the rule that appear below the current condition (i.e., only forward jumps are allowed). When done, the user clicks the OK button 240.

Figure 14:
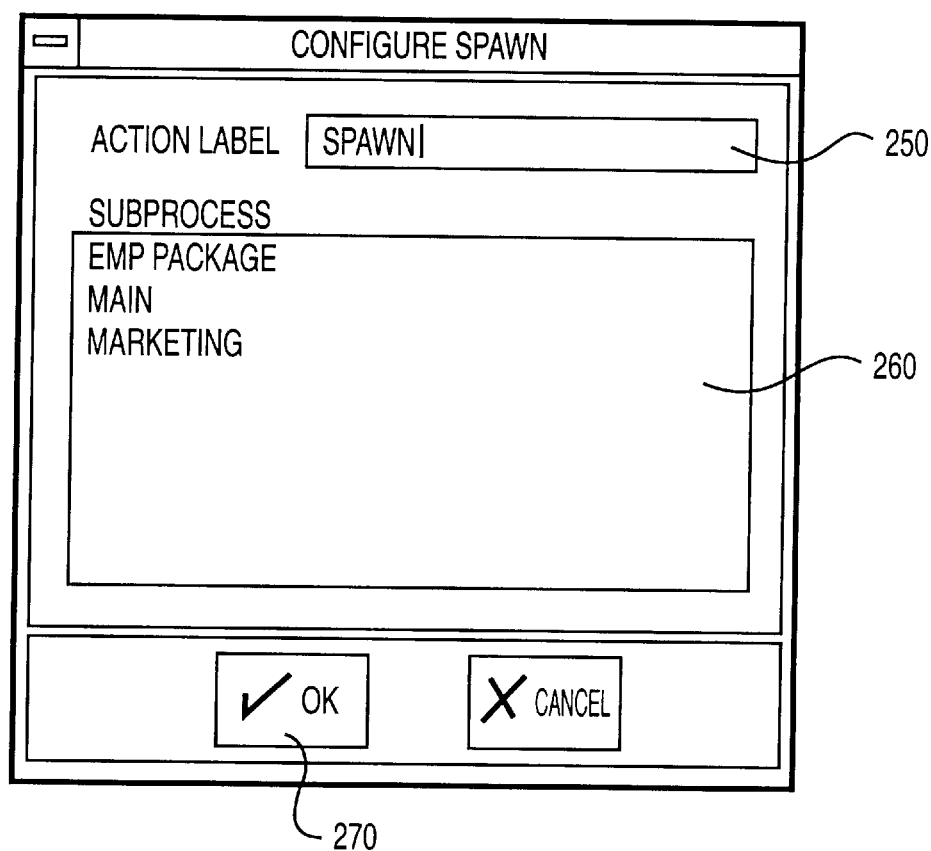
FIG. 14 shows a configure spawn dialog in which a spawn action object is configured according to embodiments of the present invention.

A spawn action object creates a copy of a case and routes the copy to any subprocess defined in the current process. To configure a spawn object, the spawn action icon is selected and accessed similarly to the action objects described above. A configure spawn dialog such as shown in FIG. 14 is displayed. The user enters, using a keyboard for example, a name for the spawn action object in the action label field 250. Next, the user selects a subprocess to spawn from the subprocess listbox 260. The user clicks the OK button 270 when done.

Figure 15:
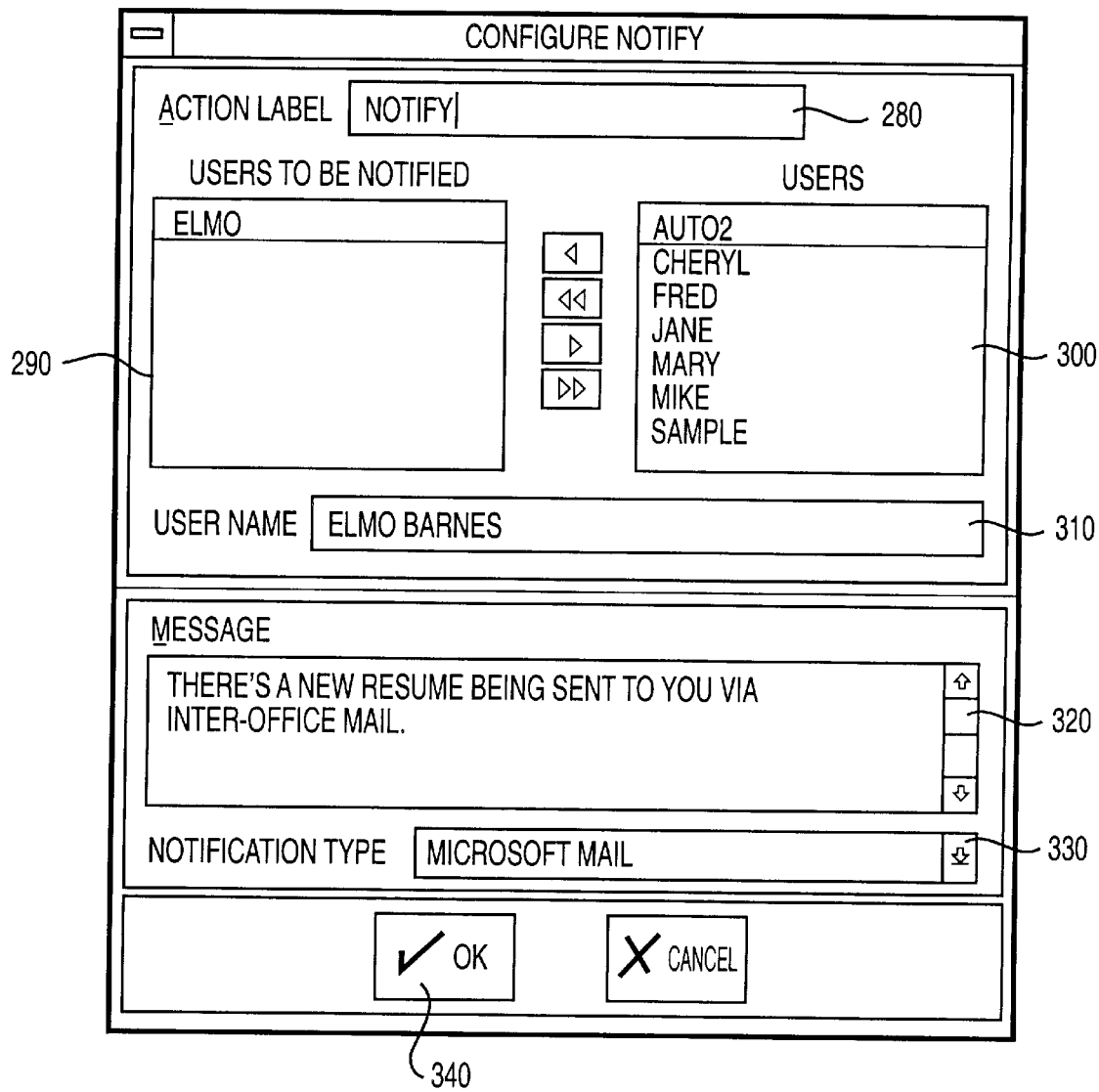
FIG. 15 shows a configure notify dialog in which a notify action object is configured according to embodiments of the present invention.

A notify action object uses available electronic mail or custom facilities to send a message to one or more users. To configure a notify action object, the user selects and accesses the notify action icon in the manner described previously with respect to the other action objects. The system displays a configure notify dialog, for example as shown in FIG. 15. A user enters the name (also referred to as the message subject) of the notify action object in the action label field 280. The user selects one or more users to be notified and moves the users from the users listbox 290 to the users to be notified listbox 300. Fields in the users to be notified listbox 300 are used to send the message. The name of each user selected from either listbox 290, 300 appears in the user name edit field 310.

To move values between the users listbox 290 and the users to be notified listbox 300, buttons can be selected for moving one or more values in either direction. After the desired users have been moved to the users to be notified listbox 300, the message text to be forwarded to the selected users is entered in the message edit field 320. The user clicks the OK button 340 when done.

Figure 16:
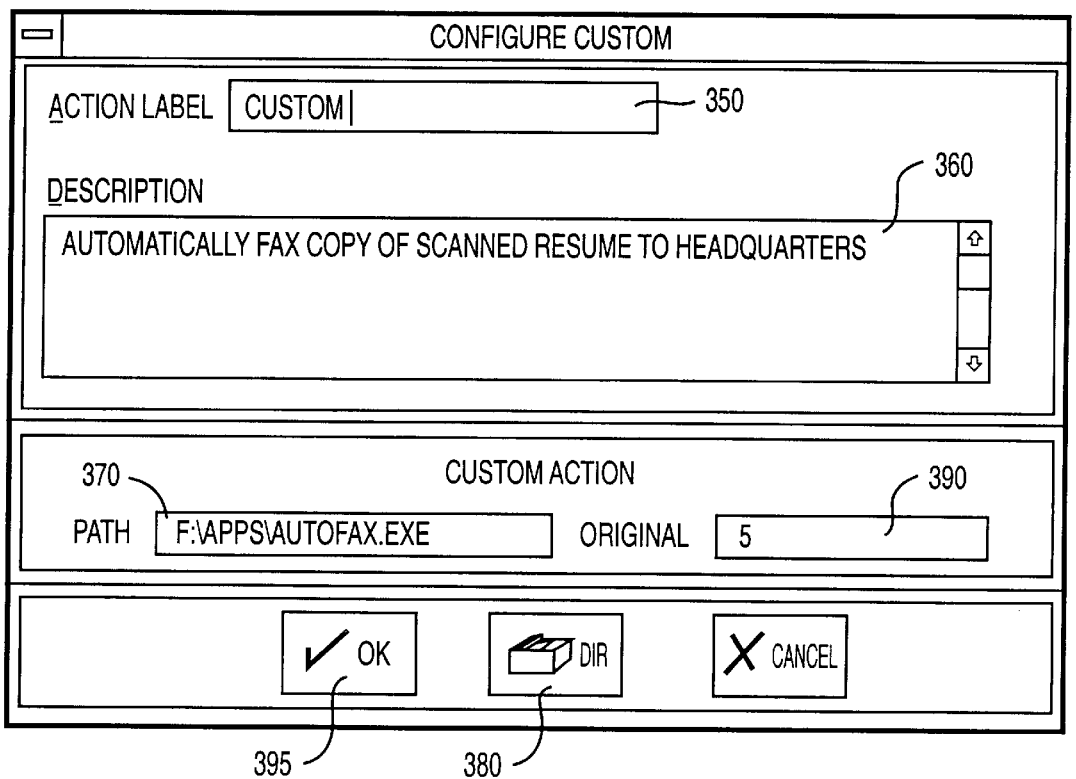
FIG. 16 shows a configure custom dialog in which a custom action object is configured according to embodiments of the present invention.

The custom action object executes any external application such as sending a facsimile, updating a mainframe database etc. To configure a custom action object, the user selects and accesses the custom action object in the manner described previously with respect to the other action objects. Then the configure custom dialog is displayed as shown for example in FIG. 16. A user enters an action label and description in the action label field 350 and description field 360, respectively. Next, the user enters the drive, path and executable filename of the external custom application into the path field 370. The user clicks on the DIR button 380 to browse the directories to retrieve the file for the path field 370. Embodiments of the present invention contemplate that the path is a WINDOWS™ DLL (dynamic link library). For the WINDOWS™ DLL, the user enters the ordinal number of the function within the DLL in the ordinal field 390. The user selects the OK button 395 when the configuration of the custom action object is complete.

Figure 17:
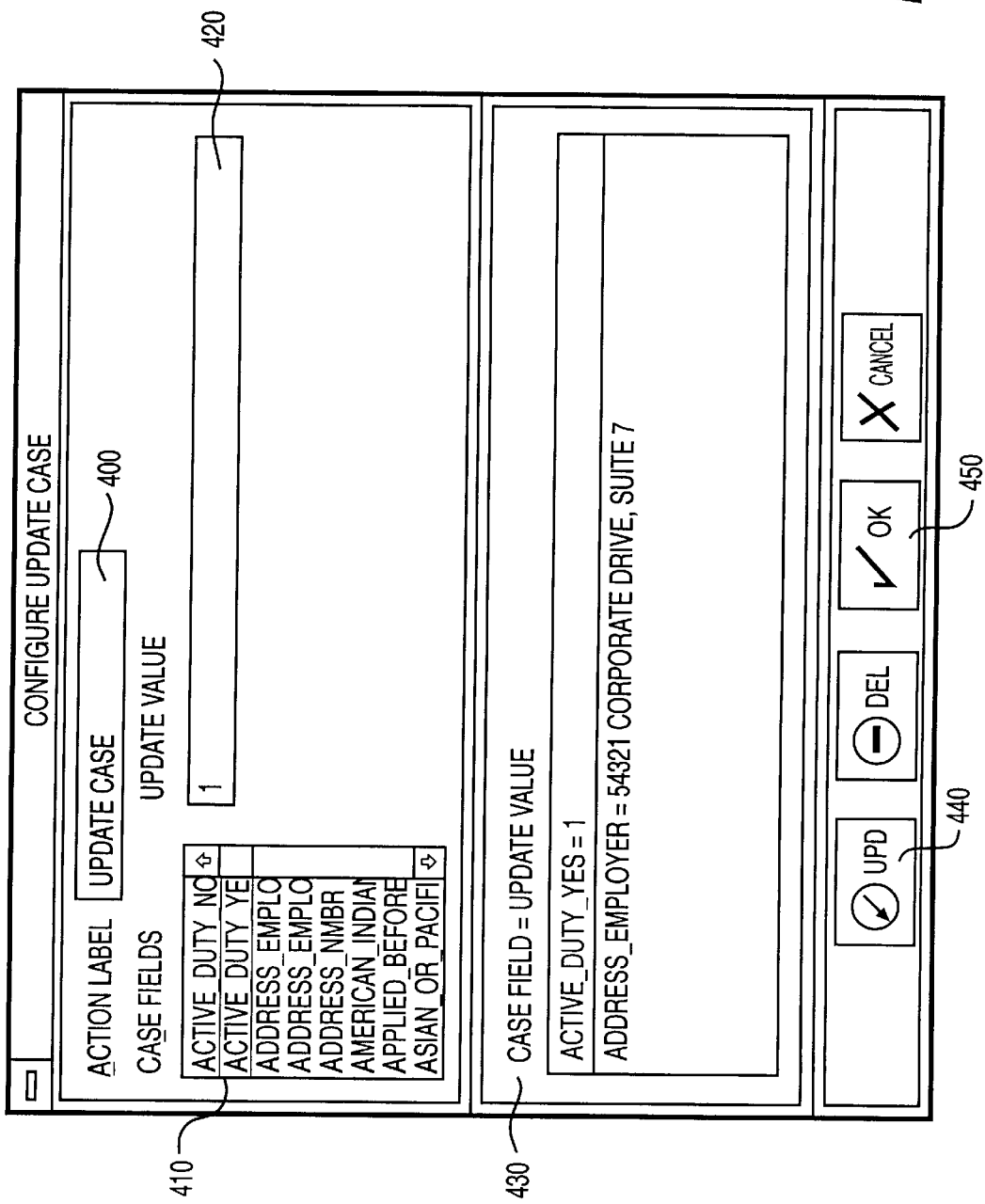
FIG. 17 shows a configure update case dialog in which an update case action object is configured according to embodiments of the present invention.

The update case data action object lets the user automatically set case data fields to a specified value, e.g., unconditionally update case data fields with constant/expression values. To configure an update case data action object, the update case data action icon is selected and accessed in the same manner as the previously described action objects. Then a configure update case dialog is displayed, for example as shown in FIG. 17. The user enters a name for the update case action object in the action label field 400. The user is now ready to enter case field value assignments. Case fields are the current fields defined for the process in which the user is defining. First, the user selects a field from a case field listbox 410. Then an update value is entered in the update value field 420 corresponding to the selected case field. To add the update value assignment to the end of the case field = update value listbox 430, the user selects the update button 440. The case field = update value listbox 430 shows a list of fields and their respective update values that have been defined. The aforementioned steps are repeated until there are no more case field values to be updated. The user selects the OK button 450 when done updating.

Figure 18:
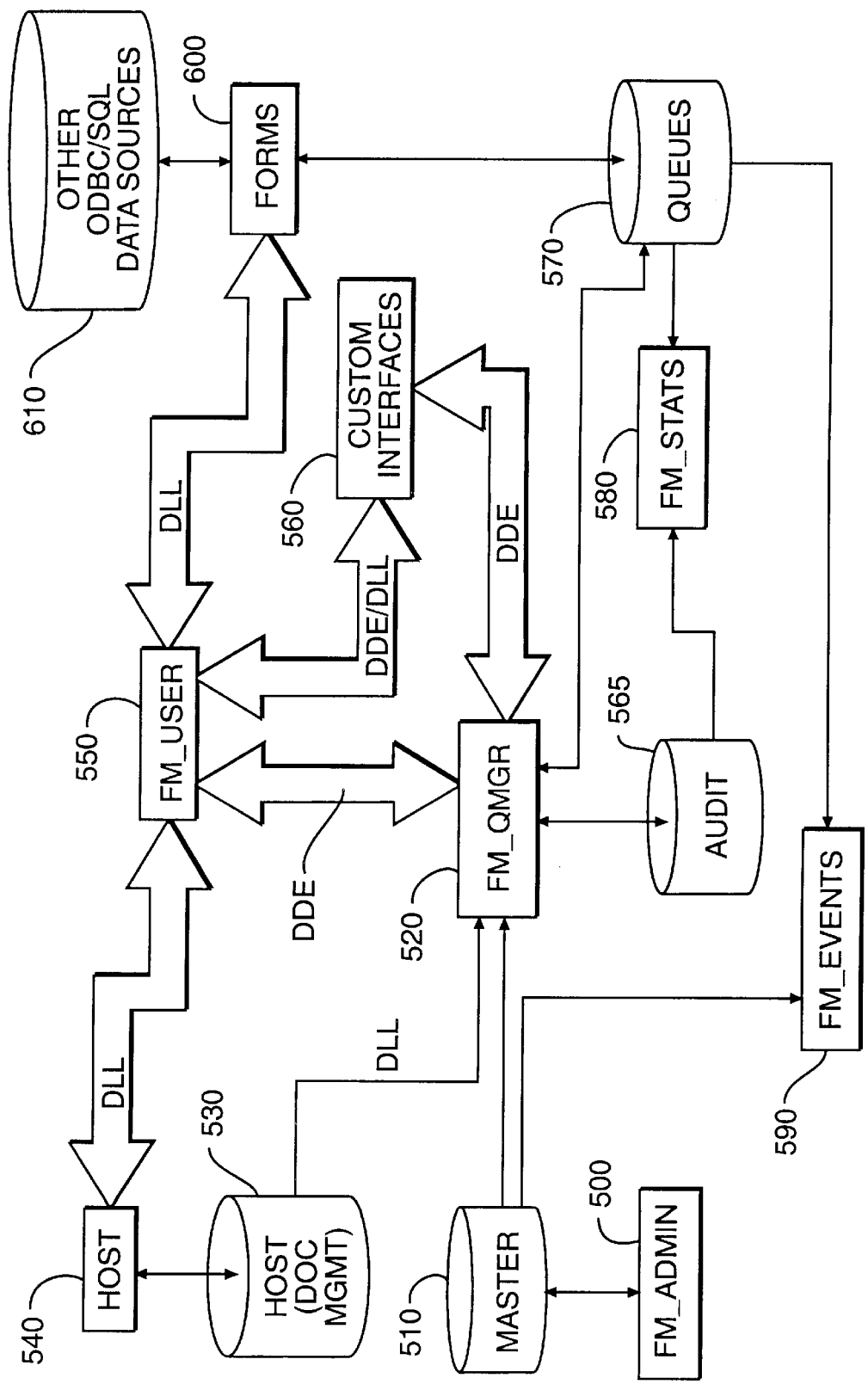
FIG.18 is a diagram of the data source/program relationships according to embodiments of an embodiment of the present invention.

A diagram of the data source/program relationships according to an exemplary embodiment of the present invention is depicted in FIG. 18. It is to be understood that FIG. 18 is an example of an environment in which the a rule is defined according to an embodiment of the invention.

A FM_ADMIN system administration module 500 allows a creator to graphically design and manage workflows. In the system administration module 500, the creator creates and manages workflow scenarios, assigns users, and defines the environment and external interface to a document management system (host). The system administration module 500 is where the creator defines a rule as described above.

Data is exchanged between the module 500 and the data source master 510. The master 510 stores data related to the process definition including defined workflows, user assignments, rules and associated actions, etc. Data from the master 510 is also transferred to FM_QMGR queue manager 520 which functions as the workflow engine.

The queue manager 520 also receives data from the host document management data source 530 which maintains indices and key information about documents kept by the host 540. The queue manager 520 handles all workflow requests from the FM_USER workstation module 550 and custom applications from custom interfaces 560, both of which are communicated in dynamic data exchange form (DDE) and/or via a DLL. An extensive set of application programming interface (API) calls are provided to allow for customization and integration of the present invention with other applications and systems. An API toolkit is built on the queue manager 520 and allows applications to search the queues as assigned by the system administration module 500, and performs the same workflow related actions and functionality found in the workstation module 550. The workstation module 550 utilizes APIs supplied from the queue manager 520. The workstation module 550 is a graphical user interface that allows users to organize, prioritize and process workflow cases using the workflow definitions defined by the creator. The host 540 interfaces with the workstation module 550 via the DLL interface defined by the creator.

An audit data source 565 is connected to the queue manager 520 and contains audit data of workflow actions that have occurred. A queues data source 570 coupled to the queue manager 520 maintains work in process data including case data and information regarding case state and location within the process. The audit data source 565 supplies audit data and the queues data source 570 supplies work in process data to the FM_STATS statistics module 580. The statistics module 580 is a comprehensive graphical reporting tool that provides a business analyst with the ability to monitor, manage, and optimize their organization's work in progress. The statistics module 580 generates adhoc queries against the queue and audit trails and graphically displays the results. Bottlenecks and inefficiencies in the workflow design can easily be identified and quickly resolved using the statistics module 580.

An FM_EVENTS events module 590 receives data from both the master data source 510 and the queues data source 570. The events module 590 watches the queues 570 and initiates events when the criteria defined in the system administration module 500 has been satisfied. Examples of initiated events are automatically increasing a case's priority versus other cases, automatically rerouting a case to another task, sending E-mail notifications, dynamically assigning resources, etc.

An electronic forms application (such as WordPerfect InForms, JetForm, Delrina), module 600, can be coupled to both the workstation module 550 and the queues data source 570, and provides a user defined "view" of the data for each task. The form can include graphics, calculations, signatures and external links to other data sources 610.

Figure 19:
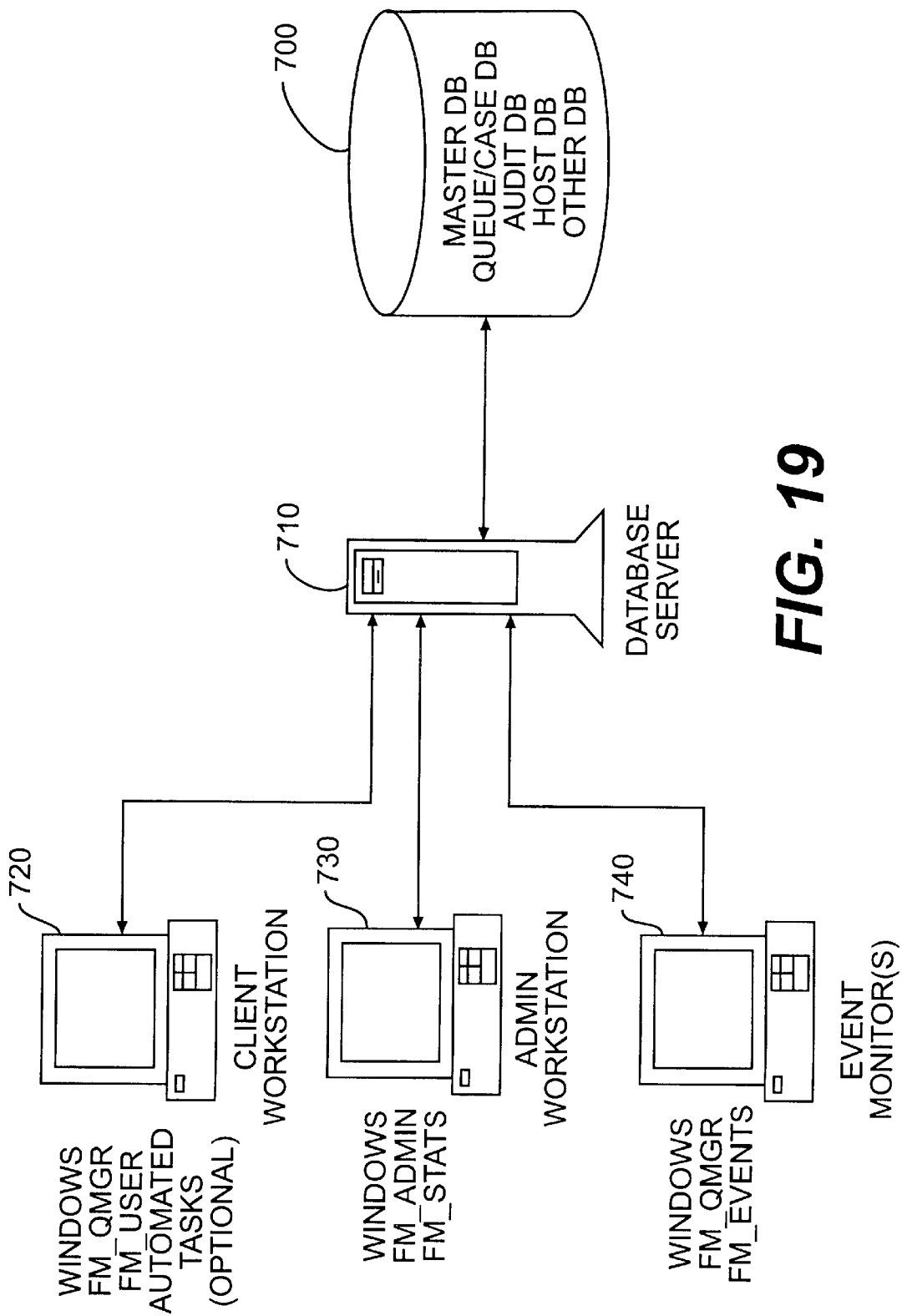
FIG. 19 is a diagram of a system relationship according to embodiments of the present invention.

The embodiments can be implemented in the system relationship depicted in FIG. 19. A database memory area 700 stores data from data sources master 510, queues 570, audit 565, host 530, and other data sources 610. A database server 710 allows the database memory area 700 to interface with a client workstation 720, and administrator workstation 730, and an event monitor(s) 740 which each contain Windows™. The client workstations also contains the queue manager module 520 and the workstation module 550. The administrator workstation 730 includes the system administration module 500 and the statistics module 580. The events monitor 740 includes the queue manager module 520 and the events module 590.

An exemplary database server 710 is an ANSI SQL relational database or other ODBC compliant database. The client workstation 720, administrator workstation 730, and events monitor 740 are contemplated to be 386 33 MHz PCs with 8 MB of memory, or better.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language (such as C, C++ or a specific assembly language) and/or hardware components (such as ASICs or PALs) can be employed in such embodiments of the present invention.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of defining a rule to be evaluated by a system comprising the steps of:

graphically selecting a condition to be associated with a rule, the condition evaluating to at least two values;

graphically displaying the condition on a display;

graphically adding condition legs to the condition on the display; and graphically associating at least one object with each condition leg on the display, wherein the at least one object is executed when the condition evaluates to the corresponding condition leg, and wherein the condition, the condition legs, and the at least one object form a dynamically modifiable and interchangeable graphical map of the rule on the display.

2. A method of defining a rule to be evaluated by a system comprising the steps of:

selecting a rule icon for a rule;

placing the rule icon in a display area;

connecting the rule icon to object icons for objects in the display area;

adding a condition icon for a condition to the rule icon including a first leg icon for a first leg and a second leg icon for a second leg; and attaching an object icon to each of the first and second leg icons, the object icon representing one of an action object or a routing object, wherein the rule icon, conditions icon, the condition leg icons, and the object icon from a dynamically modifiable and interchangeable graphical map of the rule on a display screen.

3. The method of defining a rule according to claim 2, wherein said step of adding the condition icon to the rule icon includes the steps of:

selecting the condition icon;

placing the condition icon on the rule icon in the display area;

displaying a new condition icon for a new condition in the display area connected to the rule icon;

displaying the first and second leg icons wherein the first and second leg icons are connected to the new condition icon; and configuring the condition icon.

4. The method of defining a rule according to claim 3, wherein said step of configuring the condition icon includes the steps of:

selecting the condition icon to be configured;

displaying a condition area in the display area; and defining a condition statement associated with the condition icon in the condition area.

5. The method of defining a rule according to claim 5, wherein said step of defining a condition statement includes:

inputting a condition name in the condition area; and inputting a description of the condition statement.

6. The method of defining a rule according to claim 5, wherein said step of defining a condition statement includes the steps of:

selecting a data field from a group of data fields to be evaluated by the condition statement;

inputting a value as part of the condition statement for evaluating the selected data field;

adding the condition statement to the condition icon; and displaying the condition statement in the condition area.

7. The method of defining a rule according to claim 7, wherein said step of defining a condition statement further includes the step of selecting an operator when more than one condition statement is to be added to the condition icon.

8. An apparatus for defining a rule in a system comprising:

means for graphically selecting a condition icon for a condition to be associated with a rule, condition leg icons for condition legs for the condition icon, and at least one object icon for at least one object to be associated with each condition leg icon;

wherein the at least one object includes at least one of an action object and a routing object means for graphically inputting conditions parameters to be associated with each conditions leg icon;

memory for storing the condition parameters; and a display, responsive to said selecting means, for graphically displaying the condition icon, the condition leg icons including the condition parameters, and the at least one object icon associated with each condition leg icon to form a dynamically modifiable and interchangeable graphical map of the rule.

9. The apparatus according to claim 8 wherein said selecting means includes a trackball.

10. The apparatus according to claim 8 wherein said inputting means includes a keyboard.

11. An apparatus for defining a rule in a workflow system comprising:

a display including a display window;

means for dragging a rule icon for a rule and dropping the rule icon in the display window;

means for connecting the rule icon to an object icon in the display area;

means for dragging a icon for a condition and dropping the condition icon in the display window, wherein said display displays condition leg icons for condition legs emanating from the conditions icon in the display window;

means for inputting condition parameters associated with each condition leg icon;

memory for storing the condition parameters, wherein the condition parameters are displayed adjacent to their corresponding condition leg icon; and means for dragging one of an action object icon for an action object and a routing object icon for a routing object to each condition leg icon in the display window, wherein said one of an action object icon and a routing object icon are displayed on the condition leg icon, wherein the rule icon, condition icon, condition leg icons, and the one of an action object icon and a routing object icon form a dynamically modifiable and interchangeable graphical map of the rule on the display.

12. The method of defining a rule according to claim 1, wherein the condition, condition legs, and the at least one object are represented on the display as icons.

* * * * *

UNITED STATES PATENT AND TRADEMARK OFFICE
CERTIFICATE OF CORRECTION

PATENT NO.:   5,815,152

DATED:        September 29, 1998

INVENTOR(S):  Mary F. Collier, et al.

It is certified that an error appears in the above-identified patent and that said Letters Patent is hereby corrected as shown below:

Column 12, line 19, claim 5, delete "claim 5" and insert --claim 4--;
        line 22, claim 6, delete "claim 5" and insert --claim 4--;
        line 32, claim 7, delete "claim 7" and insert --claim 6--; and
        line 65, claim 11, before "icon" insert --condition--.

Signed and Sealed this

Fifth Day of January, 1999

Attest:

Attesting Officer

*Acting Commissioner of Patents and Trademarks*